United States Patent
Chen et al.

(10) Patent No.: US 10,480,226 B1
(45) Date of Patent: Nov. 19, 2019

(54) HINGE AND ELECTRONIC DEVICE USING THE SAME

(71) Applicant: SHIN ZU SHING CO., LTD., New Taipei (TW)

(72) Inventors: Chun-Chang Chen, New Taipei (TW); Tsung-Yang Tsai, New Taipei (TW); Ming-Chin Lin, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 0 days.

(21) Appl. No.: 16/255,991

(22) Filed: Jan. 24, 2019

(51) Int. Cl.
  *G06F 1/16*  (2006.01)
  *E05D 3/12*  (2006.01)
  *F16C 11/04*  (2006.01)

(52) U.S. Cl.
  CPC .............. *E05D 3/122* (2013.01); *F16C 11/04* (2013.01); *G06F 1/1681* (2013.01); *E05Y 2900/606* (2013.01)

(58) Field of Classification Search
  CPC ................................ E05D 3/06; G06F 1/1681
  USPC ........................ 361/679.27; 16/366
  See application file for complete search history.

(56) References Cited

U.S. PATENT DOCUMENTS

| | | | |
|---|---|---|---|
| 7,936,559 B2* | 5/2011 | Chen ..................... | G06F 1/1662 16/303 |
| 8,687,354 B2 | 4/2014 | Uchiyama et al. | |
| 8,776,319 B1 | 7/2014 | Chang et al. | |
| 9,009,919 B1* | 4/2015 | Chiang ................. | G06F 1/1681 16/303 |
| 9,201,464 B2 | 12/2015 | Uchiyama et al. | |
| 9,600,036 B2 | 3/2017 | Uchiyama et al. | |
| 10,344,510 B2* | 7/2019 | Siddiqui | |
| 2007/0039132 A1* | 2/2007 | Jung ................... | H04M 1/0216 16/325 |
| 2013/0111704 A1* | 5/2013 | Mitsui ................... | H04M 1/022 16/250 |

* cited by examiner

*Primary Examiner* — Anthony Q Edwards
(74) *Attorney, Agent, or Firm* — Alan D. Kamrath; Mayer & Williams PC

(57) ABSTRACT

A hinge includes a connecting bracket, first and second revolving axles, and first and second latches. The connecting bracket has first and second restriction blocks. The first and second revolving axles are parallel with each other and pivotally disposed on the connecting bracket. The first revolving axle has first and second cams. The first cam cooperates with the first restriction block in restricting a revolving stroke of the first revolving axle. The second revolving axle has third and fourth cams. The third cam cooperates with the second restriction block in restricting a revolving stroke of the second revolving axle. Peripheries of the first to the fourth cams respectively have a convex portion and a concave portion. The first latch is slidable between the first cam and the third cam. The second latch is slidable between the second cam and the fourth cam.

9 Claims, 9 Drawing Sheets

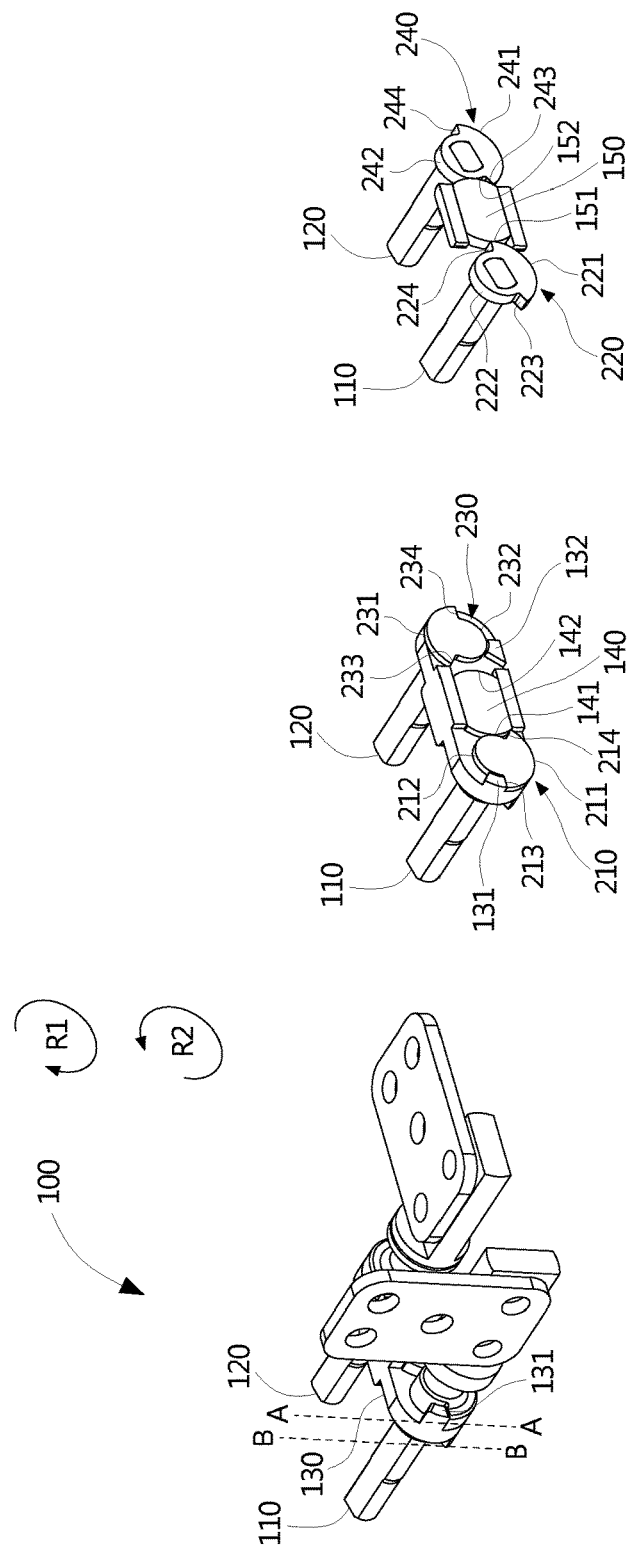

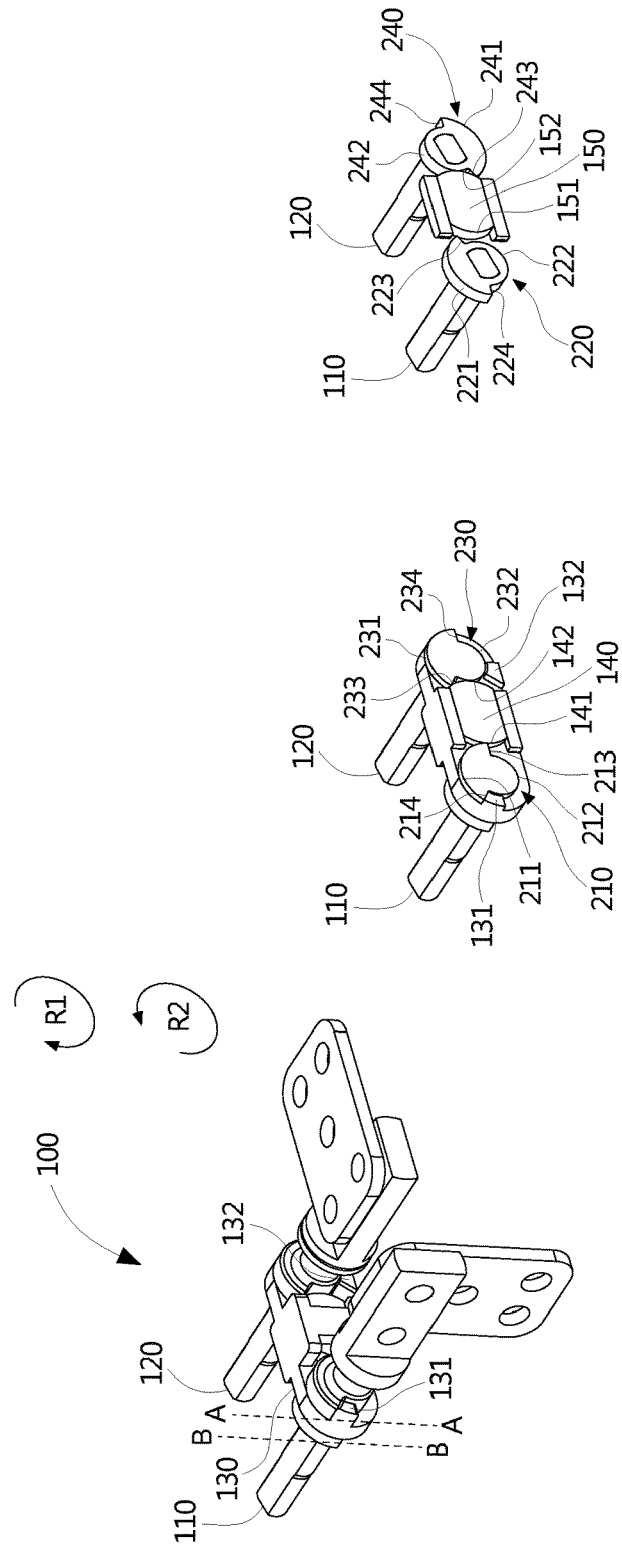

HINGE AND ELECTRONIC DEVICE USING THE SAME

TECHNICAL FIELD

The present invention relates to a hinge and an electronic device using the same and, more particularly, to a hinge with a three-stage switching structure and an electronic device using the same.

RELATED ART

Nowadays, many portable electronic devices are foldable. This kind of foldable electronic device includes two plates pivotally connected to each other and capable of being relatively folded and unfolded. The two plates can be relatively unfolded to 360 degrees. In some of known types of the foldable electronic devices, one of the plates can be provided with a screen, and the other one of the plates can be provided with components such as a mainboard, a keyboard, and a central processing unit. The electronic device may be, for example, a laptop computer. In addition, while the electronic device is unfolded to 360 degrees, it forms a configuration similar to a tablet computer, such that users can easily hold it by hand during use.

In order to be unfolded from 0 degrees to 360 degrees, the known foldable electronic device is provided with a hinge having two axles, such that two plates can respectively revolve about the axle centers of the two axles. However, the axles cannot revolve in sequence. For example, in a case that a user wants to use the electronic device as a laptop computer, the user needs to unfold the screen relative to the keyboard. During the above process, not only the axle on a side of the screen revolves, but also the axle on a side of the keyboard revolves. The two axles cannot revolve in sequence, which makes the operation of unfolding the two plates by the user not smoothly and impacts the experience of use.

SUMMARY

To address the above issue, the present invention aims to provide a hinge with a three-stage switching structure and an electronic device using the same to make two axles of the hinge be capable of revolving in sequence, such that two plates of the electronic device can be relatively folded and unfolded smoothly, and the experience of use can be improved.

In an embodiment of the present invention, a hinge includes a connecting bracket, a first revolving axle, a second revolving axle, a first latch, and a second latch. The connecting bracket is provided with a first restriction block and a second restriction block. The first revolving axle is pivotally disposed on the connecting bracket. The first revolving axle is provided with a first cam and a second cam. The first cam cooperates with the first restriction block in restricting a revolving stroke of the first revolving axle. The second revolving axle is parallel with the first revolving axle and is pivotally disposed on the connecting bracket. The second revolving axle is provided with a third cam and a fourth cam. The third cam cooperates with the second restriction block in restricting a revolving stroke of the second revolving axle. Peripheries of the first to the fourth cams are respectively provided with a convex portion and a concave portion. The concave portion has a first end and a second end. The first latch is slidably disposed between the first cam and the third cam. The first latch has a first end and a second end respectively corresponding to the first cam and the third cam. The second latch is slidably disposed between the second cam and the fourth cam. The second latch has a first end and a second end respectively corresponding to the second cam and the fourth cam. While the hinge is unfolded from 0 degrees to 360 degrees, the first latch and the second latch are pushed in sequence to slide from one side to another side to abut against the second revolving axle and the first revolving axle respectively.

In an embodiment of the present invention, while the hinge is at 0 degrees, the first restriction block abuts against the first end of the concave portion of the first cam to make the first revolving axle be incapable of revolving in a first clock direction; the second end of the first latch abuts against the convex portion of the third cam and the first end of the first latch abuts against the second end of the concave portion of the first cam to make the first revolving axle be incapable of revolving in a second clock direction opposite to the first clock direction; the second restriction block abuts against the first end of the concave portion of the third cam to make the second revolving axle be incapable of revolving in the second clock direction.

In an embodiment of the present invention, while the hinge is at a first angle, the first end of the second latch abuts against the convex portion of the second cam and the second end of the second latch abuts against the first end of the concave portion of the fourth cam to make the second revolving axle be incapable of revolving in the first clock direction; the first end and the second end of the first latch respectively correspond to the concave portion of the first cam and the concave portion of the third cam to make the first revolving axle be capable of revolving in the second clock direction.

In an embodiment of the present invention, while the hinge is at a second angle, the first restriction block abuts against the second end of the concave portion of the first cam to make the first revolving axle be incapable of revolving in the second clock direction; the first end of the first latch abuts against the convex portion of the first cam and the second end of the first latch abuts against the first end of the concave portion of the third cam to make the second revolving axle be incapable of revolving in the second clock direction; the first end and the second end of the second latch respectively correspond to the concave portion of the second cam and the concave portion of the fourth cam to make the second revolving axle be capable of revolving in the first clock direction.

In an embodiment of the present invention, while the hinge is at 360 degrees, the second restriction block abuts against the second end of the concave portion of the third cam to make the second revolving axle be incapable of revolving in the first clock direction; the second end of the second latch abuts against the convex portion of the fourth cam and the first end of the second latch abuts against the first end of the concave portion of the second cam to make the first revolving axle be incapable of revolving in the first clock direction.

In an embodiment of the present invention, the first angle is 90 degrees, and the second angle is 270 degrees.

In an embodiment of the present invention, the hinge further includes a first torque member and a second torque member. The first torque member is disposed on the first revolving axle, and the second torque member is disposed on the second revolving axle.

In an embodiment of the present invention, an electronic device includes the above hinge, a first plate, and a second plate. The first plate is connected to the first revolving axle, and the second plate is connected to the second revolving axle.

In an embodiment of the present invention, the hinge further includes a first fixation member and a second fixation member. The first fixation member is connected to the first revolving axle. The second fixation member is connected to the second revolving axle. The first plate is connected to the first revolving axle by being connected to the first fixation member. The second plate is connected to the second revolving axle by being connected to the second fixation member.

Concisely, according to the embodiments of the present invention, two axles of the hinge is capable of revolving in sequence, such that two plates of the electronic device can be relatively folded and unfolded, smoothly, and the experience of use can be improved.

The features of the present invention will no doubt become understandable to those of ordinary skill in the art after reading the following detailed description of the preferred embodiment that is illustrated in the various figures and drawings.

BRIEF DESCRIPTION OF THE DRAWINGS

FIG. 7A illustrates a schematic view of the hinge of FIG. 2 at 90 degrees;

FIG. 7B and FIG. 7C respectively illustrate cross sectional views of the hinge of FIG. 7A at section A-A and section B-B;

FIG. 8A illustrates a schematic view of the hinge of FIG. 2 at 270 degrees;

FIG. 8B and FIG. 8C respectively illustrate cross sectional views of the hinge of FIG. 8A at section A-A and section B-B;

DETAILED DESCRIPTION

Figure 1:
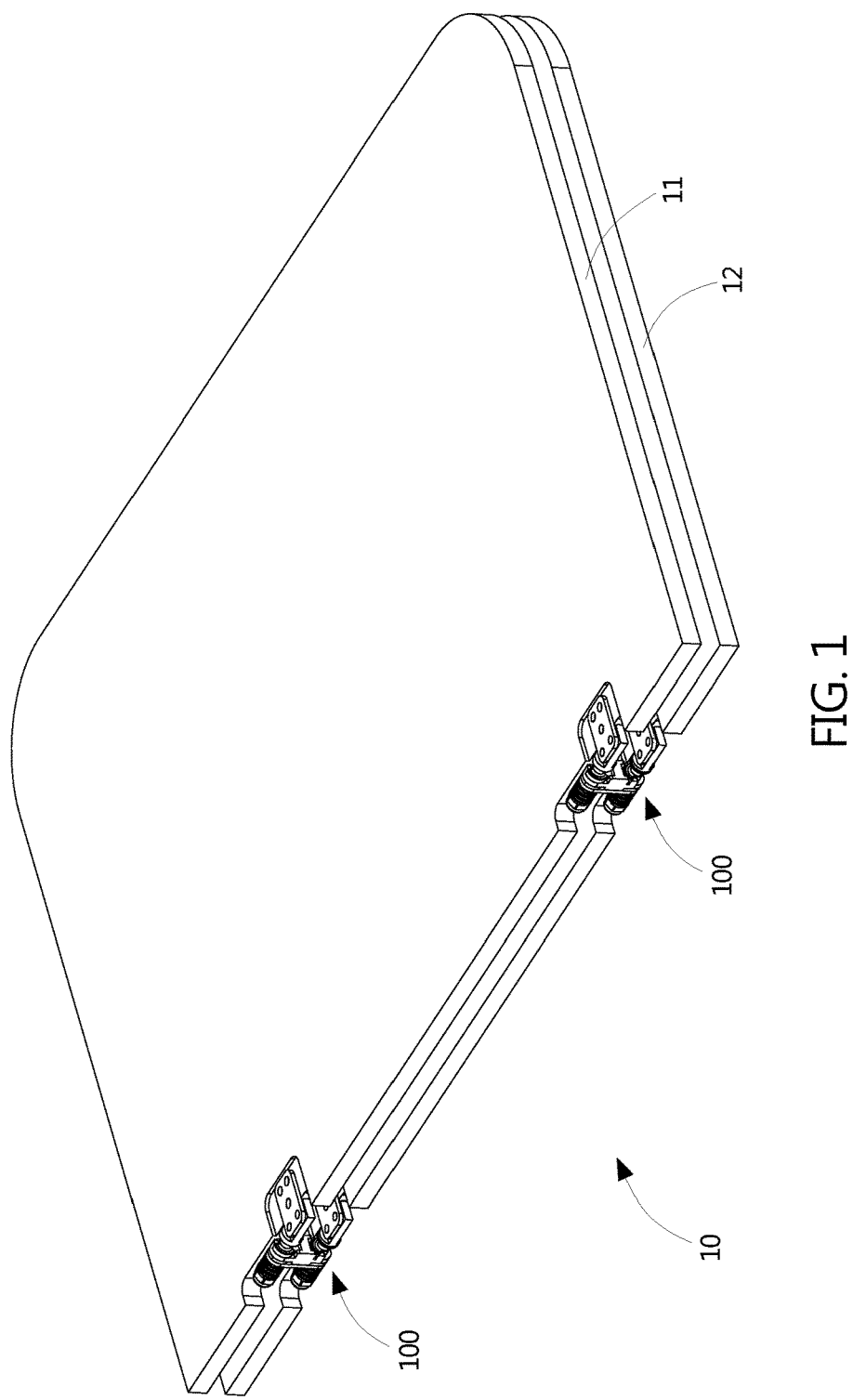
FIG. 1 illustrates a schematic view of an electronic device according to an embodiment of the present invention.

Please refer to FIG. 1. FIG. 1 is a schematic view of an electronic device 10 according to an embodiment of the present invention. In the embodiment, the electronic device 10 is, but is not limited to, a foldable electronic device such as a laptop computer. The electronic device 10 includes a hinge 100, a first plate 11, and a second plate 12. The hinge 100 is for connecting the first plate 11 and the second plate 12 to make the first plate 11 and the second plate 12 be capable of being relatively folded and unfolded. In the embodiment, the first plate 11 and the second plate 12 can be relatively folded to 0 degrees and to be relatively unfolded to 360 degrees. The first plate 11 is, for example, provided with a screen, and the second plate 12 is, for example, provided with a keyboard and a mainboard. While the first plate 11 is unfolded relative to the second plate 12 from 90 degrees to 160 degrees, it is a configuration suitable for being used as a laptop computer. While the first plate 11 is unfolded relative to the second plate 12 to 360 degrees, back sides of the first plate 11 and the second plate 12 are against each other, and the screen is outwardly shown, which is a configuration suitable for being used as a tablet computer. Such configuration is convenient to a user to hold the electronic device 10 by hand to use.

Figure 2:
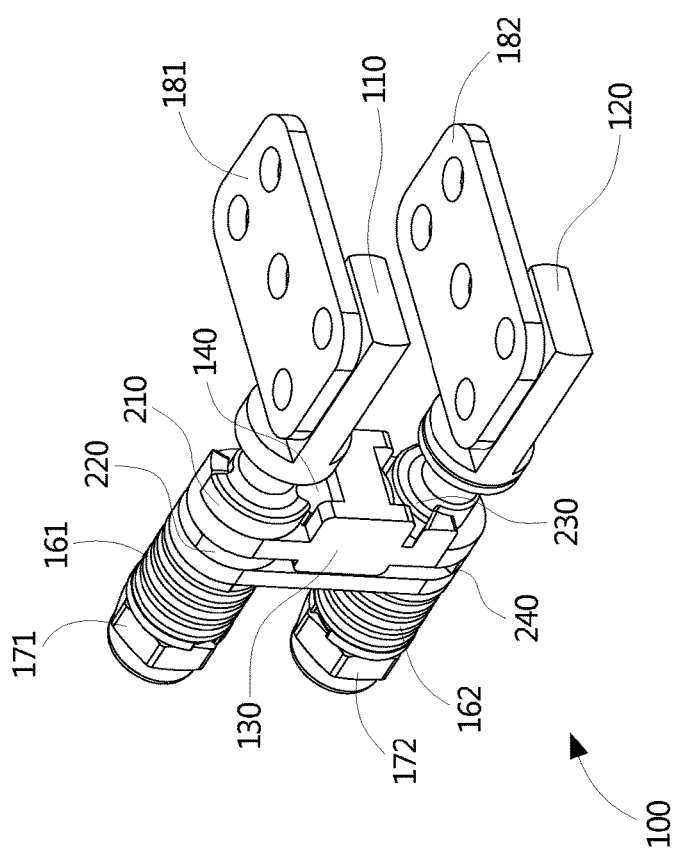
FIG. 2 illustrates a schematic view of a hinge according to an embodiment of the present invention.
Figure 3:
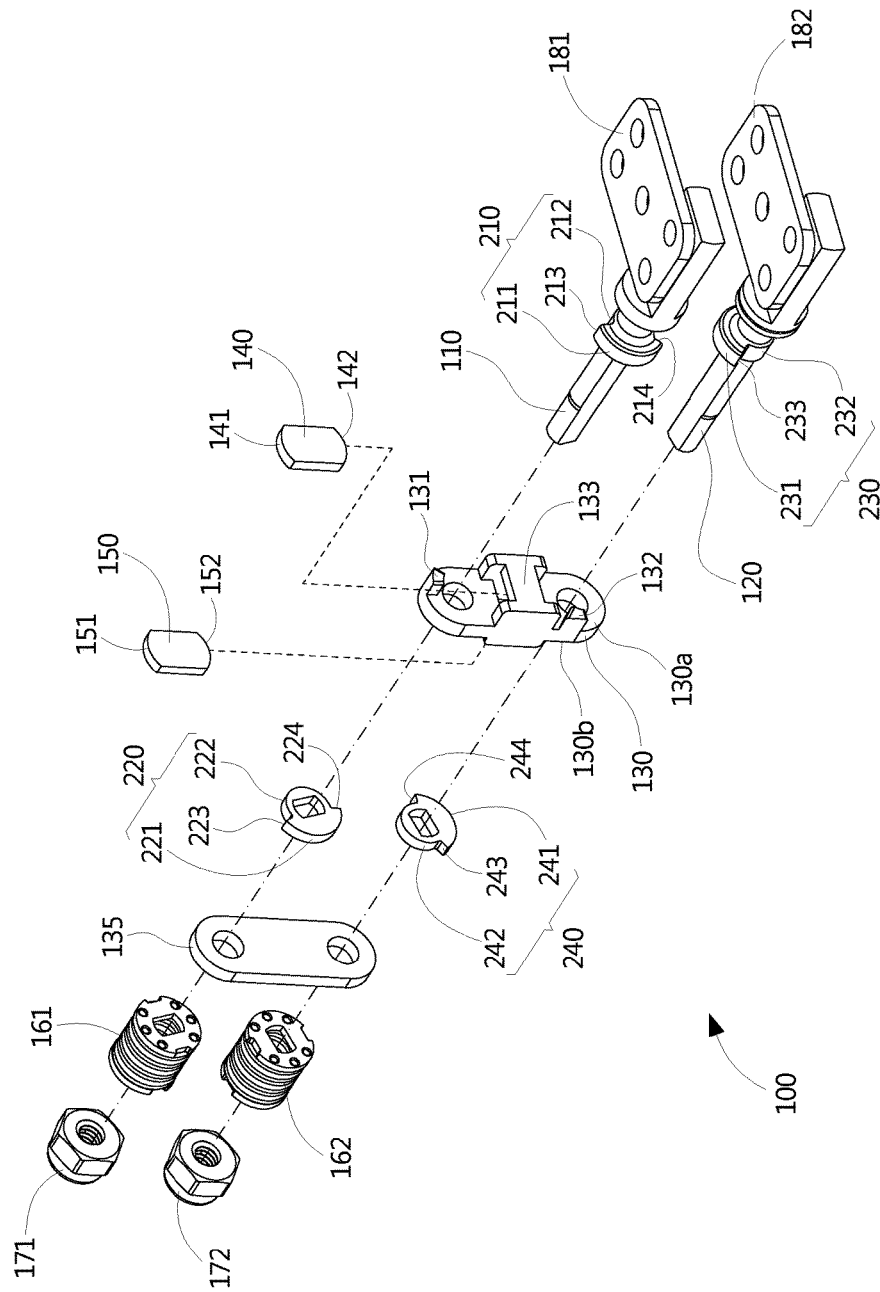
FIG. 3 illustrates an exploded view of the hinge of FIG. 2.
Figure 4:
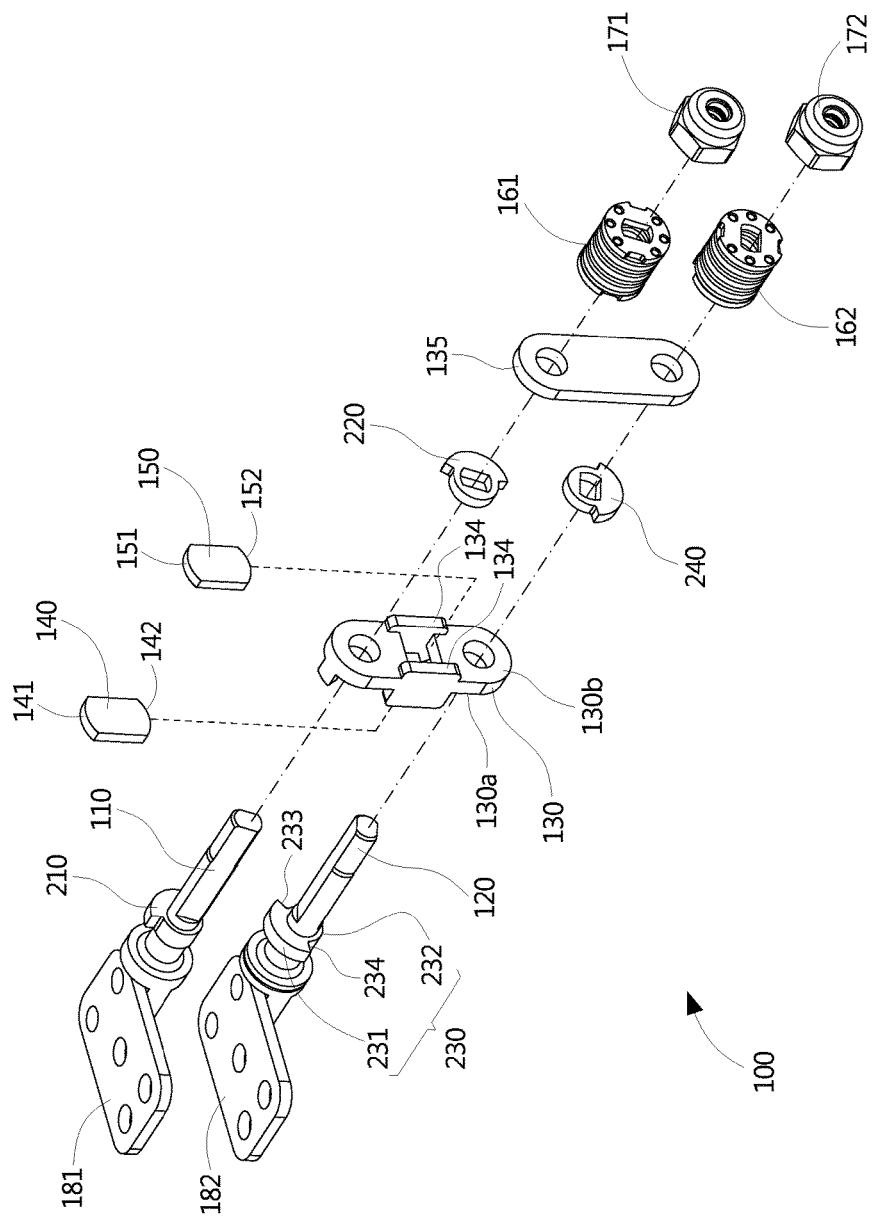
FIG. 4 illustrates an exploded view of the hinge of FIG. 2 at another viewing angle.

Please refer to FIG. 2 to FIG. 4. FIG. 2 is a schematic view of the hinge 100 according to an embodiment of the present invention. FIG. 3 is an exploded view of the hinge 100 of FIG. 2. FIG. 4 is an exploded view of the hinge 100 of FIG. 2 at another viewing angle. The hinge 100 includes a first revolving axle 110, a second revolving axle 120, a connecting bracket 130, a first latch 140, and a second latch 150.

The first revolving axle 110 is provided with a first cam 210 and a second cam 220. While the first revolving axle 110 revolves, the first cam 210 and the second cam 220 revolves in with the first revolving axle 110. In the embodiment, the first cam 210 and the first revolving axle 110 are integrated into one piece. The second cam 220 and the first revolving axle 110 are, but are not limited to, assembled to each other by a noncircular hole of the second cam 220 coupled to a noncircular axle portion of the first revolving axle 110. A periphery of the first cam 210 has a convex portion 211 and a concave portion 212. The concave portion 212 has a first end 213 and a second end 214. A periphery of the second cam 220 has a convex portion 221 and a concave portion 222. The concave portion 222 has a first end 223 and a second end 224.

The second revolving axle 120 is provided with a third cam 230 and a fourth cam 240. While the second revolving axle 120 revolves, the third cam 230 and the fourth cam 240 revolves in with the revolving of the second revolving axle 120. In the embodiment, the third cam 230 and the second revolving axle 120 are integrated into one piece. The fourth cam 240 and the second revolving axle 120 are, but are not limited to, assembled to each other by a noncircular hole of the fourth cam 240 coupled to a noncircular axle portion of the second revolving axle 120. A periphery of the third cam 230 has a convex portion 231 and a concave portion 232. The concave portion 232 has a first end 233 and a second end 234. A periphery of the fourth cam 240 has a convex portion 241 and a concave portion 242. The concave portion 242 has a first end 243 and a second end 244.

The connecting bracket 130 has a first wall surface 130a and a second wall surface 130b opposite to each other. The first wall surface 130a of the connecting bracket 130 is provided with a first restriction block 131 and a second restriction block 132. The first revolving axle 110 is pivotally disposed on an upper end portion of the connecting bracket 130. The first cam 210 and the second cam 220 of the first revolving axle 110 respectively abut against the first wall surface 130a and the second wall surface 130b of the connecting bracket 130. The first cam 210 cooperates with the first restriction block 131 in restricting a revolving stroke of the first revolving axle 110. The second revolving axle 120 is parallel with the first revolving axle 110 and is pivotally disposed on a lower end portion of the connecting bracket 130. The third cam 230 and the fourth cam 240 of the second revolving axle 120 respectively abut against the first wall surface 130a and the second wall surface 130b of the connecting bracket 130. The third cam 230 cooperates with the second restriction block 132 in restricting a revolving stroke of the second revolving axle 120.

The first latch 140 is slidably disposed between the first cam 210 and the third cam 230. The first latch 140 has a first end 141 and a second end 142 respectively corresponding to the first cam 210 and the third cam 230. In the embodiment, there is a receiving slot 133 provided between the upper end portion and the lower end portion of the first wall surface 130a of the connecting bracket 130. The receiving slot 133 has a space extending in the first wall surface 130a for receiving the first latch 140, such that the first latch 140 can only slide up and down while contacting the first wall surface 130a of the connecting bracket 130. Since the first cam 210 and the third cam 230 both contact the first wall surface 130a of the connecting bracket 130 and are respectively at the upper end portion and the lower end portion of the connecting bracket 130; therefore, the first latch 140 is slidably disposed between the first cam 210 and the third cam 230.

The second latch 150 is slidably disposed between the second cam 220 and the fourth cam 240. The second latch 150 has a first end 151 and a second end 152 respectively corresponding to the second cam 220 and the fourth cam 240. In the embodiment, there are two parallel convex ribs 134 provided between the upper end portion and the lower end portion of the second wall surface 130b of the connecting bracket 130. The connecting bracket 130 further includes a connecting plate 135. The connecting plate 135 and the convex ribs 134 are connected to form a space extending in the second wall surface 130b for receiving the second latch 150, such that the second latch 150 can only slide up and down while contacting the second wall surface 130b of the connecting bracket 130. Since the second cam 220 and the fourth cam 240 both contact the second wall surface 130b of the connecting bracket 130 and are respectively at the upper end portion and the lower end portion of the connecting bracket 130; therefore, the second latch 150 is slidably disposed between the second cam 220 and the fourth cam 240.

The hinge 100 further includes a first torque member 161, a second torque member 162, a first nut 171, and a second nut 172. The first torque member 161 is disposed on the first revolving axle 110 and an end of the first torque member 161 is against the connecting plate 135. The first nut 171 is locked on an end of the first revolving axle 110 and abuts against another end of the first torque member 161. Thereby, the friction (corresponding to an applied torque required to have the first revolving axle 110 revolve) can be generated while the first revolving axle 110 revolves. The second torque member 162 is disposed on the second revolving axle 120 and an end of the second torque member 162 is against the connecting plate 135. The second nut 172 is locked on an end of the second revolving axle 120 and abuts against another end of the second torque member 162. Thereby, the friction (corresponding to an applied torque required to have the second revolving axle 120 revolve) can be generated while the second revolving axle 120 revolves.

The hinge 100 further includes a first fixation member 181 and a second fixation member 182. The first fixation member 181 is connected to the first revolving axle 110. The second fixation member 182 is connected to the second revolving axle 120. As shown in FIG. 1, the first plate 11 of the electronic device 10 is connected to the first revolving axle 110 by being connected to the first fixation member 181, and the second plate 12 of the electronic device 10 is connected to the second revolving axle 120 by being connected to the second fixation member 182. However, the embodiment is not to limit the invention. For example, the first plate and the second plate of the electronic device may be directly connected to the first revolving axle and the second revolving axle, respectively.

Figure 5:
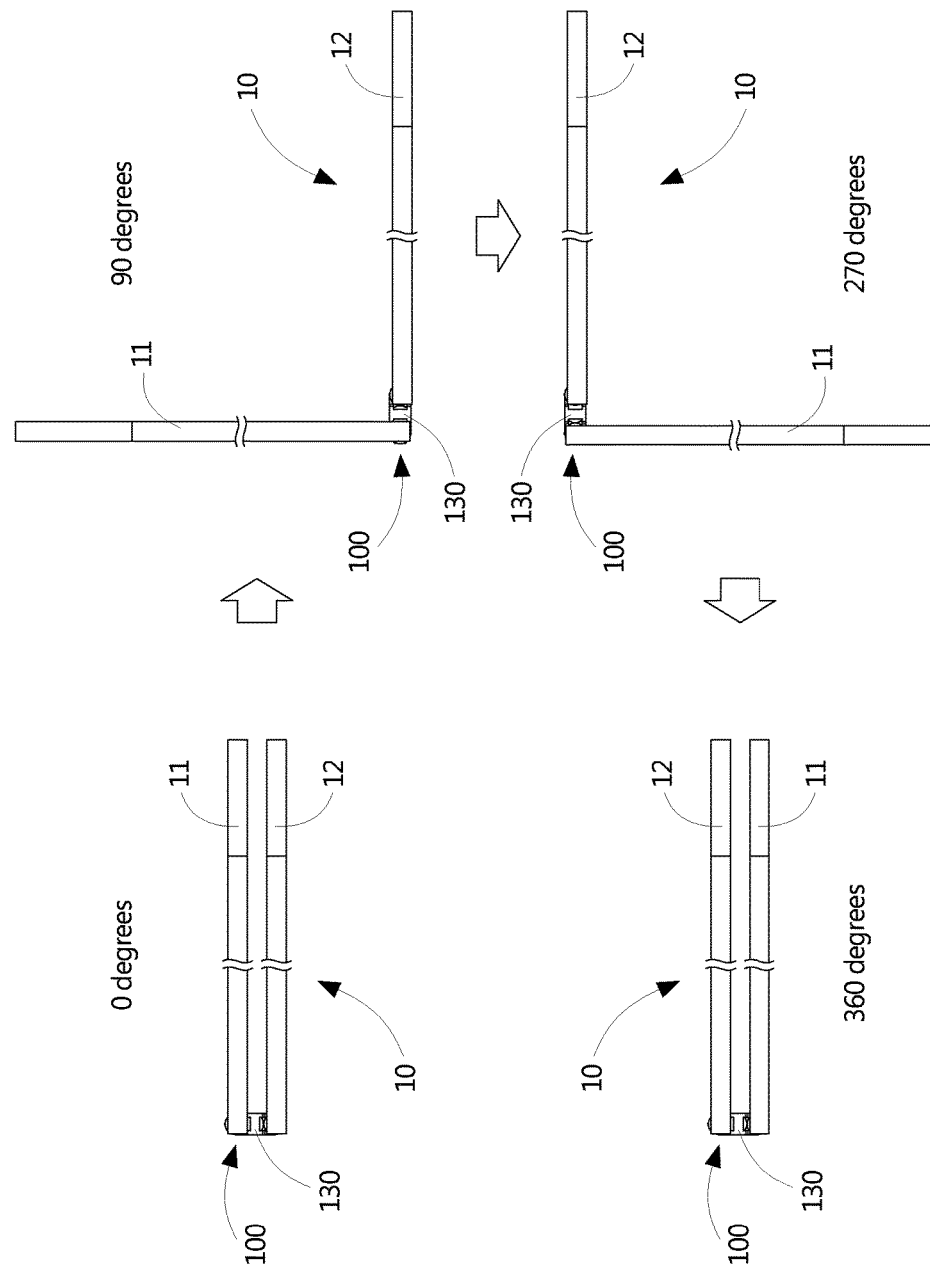
FIG. 5 illustrates a schematic view of a switching process of the electronic device of FIG. 1 at 0 degrees, 90 degrees, 270 degrees, and 360 degrees.

Please refer to FIG. 5. FIG. 5 is a schematic view of a switching process of the electronic device 10 of FIG. 1 at 0 degrees, 90 degrees, 270 degrees, and 360 degrees. Since the first plate 11 and the second plate 12 of the electronic device 10 are respectively connected to the first revolving axle 110 and the second revolving axle 120 of the hinge 100, the first revolving axle 110 and the second revolving axle 120 of the hinge 100 may revolve relatively to a certain angle while the first plate 11 and the second plate 12 of the electronic device 10 are relatively folded or unfolded to the certain angle. In such case, it is called that the electronic device 10 is at the certain angle. In the embodiment, the hinge 100 has a three-stage switching structure of 0-90 degrees, 90-270 degrees, and 270-360 degrees. However, the embodiment is not to limit the invention. Varied kinds of three-stage switching structure, e.g., a three-stage switching structure of 0-135 degrees, 135-225 degrees, and 225-360 degrees, can be easily designed by adjusting the positions of the first restriction block and the second restriction block and the positions of the convex portions and the concave portions of the first to the fourth cams.

Figure 6C:
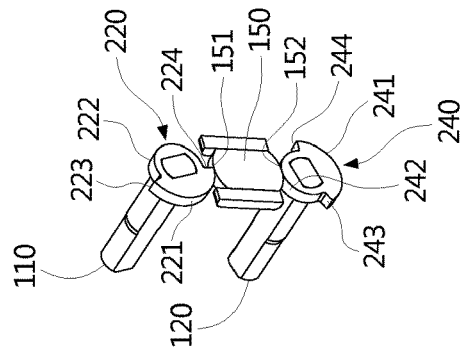
FIG. 6B and FIG. 6C respectively illustrate cross sectional views of the hinge of FIG. 6A at section A-A and section B-B.
Figure 6B:
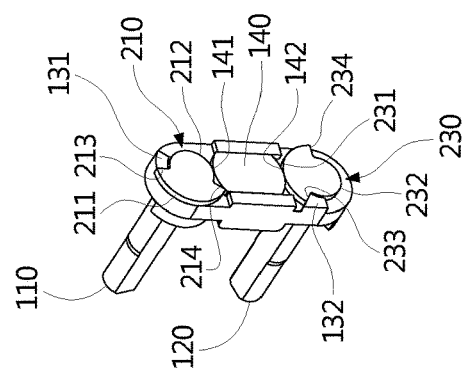
Figure 6A:
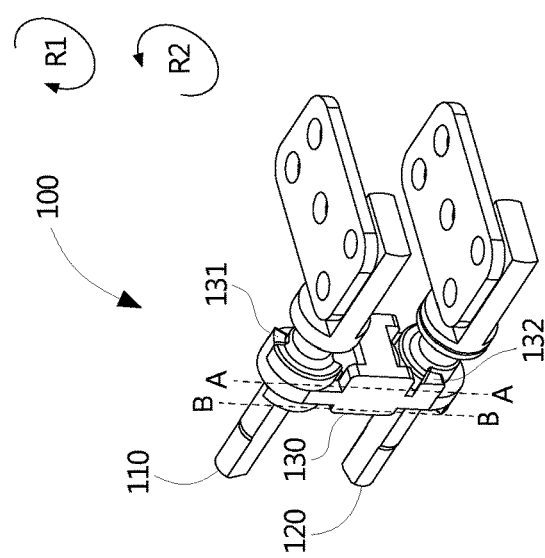
FIG. 6A illustrates a schematic view of the hinge of FIG. 2 at 0 degrees.

Please refer to FIG. 5 and FIG. 6A to FIG. 6C. FIG. 6A is a schematic view of the hinge 100 of FIG. 2 at 0 degrees without showing a part of components. FIG. 6B is a cross sectional view of the hinge 100 of FIG. 6A at section A-A regarding the first latch 140, the first cam 210, and the third cam 230. FIG. 6C is a cross sectional view of the hinge 100 of FIG. 6A at section B-B regarding the second latch 150, the second cam 220, and the fourth cam 240. While the hinge 100 is at 0 degrees, the first restriction block 131 abuts against the first end 213 of the concave portion 212 of the first cam 210 to make the first revolving axle 110 be incapable of revolving in a first clock direction R1. The second end 142 of the first latch 140 abuts against the convex portion 231 of the third cam 230 and the first end 141 of the first latch 140 abuts against the second end 214 of the concave portion 212 of the first cam 210 to make the first revolving axle 110 be incapable of revolving in a second clock direction R2 opposite to the first clock direction R1. In such case, the first revolving axle 110 cannot revolve in the first clock direction R1 and also cannot revolve in the second clock direction R2, i.e., the first revolving axle 110 is locked.

While the hinge 100 is at 0 degrees, the second restriction block 132 abuts against the first end 233 of the concave portion 232 of the third cam 230 to make the second revolving axle 120 be incapable of revolving in the second clock direction R2. In such case, the second revolving axle 120 is not locked; however, the second revolving axle 120 can only revolve in the first clock direction R1. Consequently, the first revolving axle 110 and the connecting bracket 130 as a whole can only revolve in the second clock direction R2 about the second revolving axle 120, which also means that the first plate 11 and the connecting bracket 130 as a whole can only revolve in the second clock direction R2. While the first plate 11 and the connecting bracket 130 as a whole revolve in the second clock direction R2 to 90 degrees, the hinge 100 is at 90 degrees. Also, when the hinge 100 is at 0 degrees, FIG. 6C illustrates that the first end 151 of the second latch 150 abuts against the second end 224 of the concave portion 222 of the second cam 220 while the second end 152 of the second latch 150 corresponds to the concave portion 242 of the fourth cam 240; more specifically, the second end 152 of the second latch 150 abuts neither the first end 243 nor the second end 244 of the concave 242 of the fourth cam 240, and this will not hinder the first revolving axle 110 and the connecting bracket 130 as a whole to rotate about the second revolving axle 120.

Please refer to FIG. 5 and FIG. 7A to FIG. 7C. FIG. 7A is a schematic view of the hinge 100 of FIG. 2 at 90 degrees without showing a part of components. FIG. 7B is a cross sectional view of the hinge 100 of FIG. 7A at section A-A regarding the first latch 140, the first cam 210, and the third cam 230. FIG. 7C is a cross sectional view of the hinge 100 of FIG. 7A at section B-B regarding the second latch 150, the second cam 220, and the fourth cam 240. While the hinge 100 is at 90 degrees, the first end 151 of the second latch 150 abuts against the convex portion 221 of the second cam 220 and the second end 152 of the second latch 150 abuts against the first end 243 of the concave portion 242 of the fourth cam 240 to make the second revolving axle 120 be incapable of revolving in the first clock direction R1. In other words, "while the first plate 11 and the connecting bracket 130 as a whole revolve in the second clock direction R2 to 90 degrees" as recited in the above paragraph, the second end 152 of the second latch 150 abuts against the first end 243 of the concave portion 242 of the fourth cam 240 to make the first plate 11 and the connecting bracket 130 be unable to revolve anymore after revolving to 90 degrees. That is to say, the second revolving axle 120 cannot revolve in the first clock direction R1.

When the hinge 100 is at 0 degrees as shown in FIG. 6B and FIG. 6C, "the second revolving axle 120 is not locked . . . can only revolve in the first clock direction R1" as described in the paragraph before the previous paragraph, and the second revolving axle 120 cannot revolve in the first clock direction R1 anymore after the second revolving axle 120 revolves to 90 degrees to have the hinge 100 be at 90 degrees, as shown in FIG. 7B and FIG. 7C, the hinge 100 can switch to a configuration with a greater angle only by the first revolving axle 110 revolving in the second clock direction R2, and the rotation of the first revolving axle 110 is shown in FIG. 7C and FIG. 8C. In such case, the first revolving axle 110 needs to be unlocked. That is to say, in FIG. 7C, the second cam 220 of the first revolving axle 110 is able to rotate but the first cam 210 of the first revolving axle 110 is unable to rotate because the first end 141 of the first latch 140 abuts against the second end 214 of the concave portion 212 of the first cam 210 to make the first revolving axle 110 be incapable of revolving in the second clock direction R2. Therefore the first revolving axle 110 needs to be unlocked so that the hinge 100 can switch from 90 degrees to a greater angle. Referring to FIG. 7B, the first end 141 and the second end 142 of the first latch 140 respectively correspond to the concave portion 212 of the first cam 210 and the concave portion 232 of the third cam 230 to make the first revolving axle 110 be capable of revolving in the second clock direction R2. That is, as shown in FIG. 7B, the first end 213 of the concave portion 212 of the first cam 210 of the first revolving axle 110 and the first restriction block 131 abut against each other to make the first revolving axle 110 be incapable of revolving in the first clock direction R1. Therefore, the first revolving axle 110 will revolve in the second clock direction R2. During the revolving process, the convex portion 211 of the first cam 210 of the first revolving axle 110 will be used to push the first end 141 of the first latch 140. The convex portion 211 of the first cam 210 starts to continuously push the first latch 140 to make the first latch 140 gradually slide to another side and ultimately to make the second end 142 of the first latch 140 completely abut against the first end 233 of the concave portion 232 of the third cam 230. In the process, the first revolving axle 110 have revolved in the second clock direction R2 to 180 degrees until the first restriction block 131 abuts against the second end 214 of the concave portion 212 of the first cam 210, such that the hinge 100 is at 270 degrees as shown in FIG. 8A and FIG. 8B.

Please refer to FIG. 5 and FIG. 8A to FIG. 8C. FIG. 8A is a schematic view of the hinge 100 of FIG. 2 at 270 degrees without showing a part of components. FIG. 8B is a cross sectional view of the hinge 100 of FIG. 8A at section A-A regarding the first latch 140, the first cam 210, and the third cam 230. FIG. 8C is a cross sectional view of the hinge 100 of FIG. 8A at section B-B regarding the second latch 150, the second cam 220, and the fourth cam 240. While the hinge 100 is at 270 degrees, the first restriction block 131 abuts against the second end 214 of the concave portion 212 of the first cam 210 to make the first revolving axle 110 be incapable of revolving in the second clock direction R2. The first end 141 of the first latch 140 abuts against the convex portion 211 of the first cam 210 and the second end 142 of the first latch 140 abuts against the first end 233 of the concave portion 232 of the third cam 230 to make the second revolving axle 120 be incapable of revolving in the second clock direction R2.

Since both of the first revolving axle 110 and the second revolving axle 120 cannot revolve in the second clock direction R2, the hinge 100 can switch to a configuration with a greater angle only by the second revolving axle 120 revolving in the first clock direction R1; and this means that the first revolving axle 110 and the connecting bracket 130 as a whole can only revolve in the second clock direction R2 about the second revolving axle 120. However, the second revolving axle 120 cannot continue to revolve in the first clock direction R1 while the hinge 100 is at 90 degrees; therefore, the second revolving axle 120 needs to be unlocked to be capable of revolving in the first clock direction R1. While the hinge 100 is at 270 degrees, the first end 151 and the second end 152 of the second latch 150 respectively correspond to the concave portion 222 of the second cam 220 and the concave portion 242 of the fourth cam 240 to make the second revolving axle 120 be capable of revolving in the first clock direction R1. In addition, in the process of the second revolving axle 120 revolving in the first clock direction R1, the second latch 150 is gradually pushed to another side. That is to say, in the process of the second revolving axle 120 revolving in the first clock direction R1, the convex portion 241 of the fourth cam 240 of the second revolving axle 120 pushes the second end 152 of the second latch 150 to make the second latch 150 gradually slide to another side and coupled to the concave portion 222 of the second cam 220 of the first revolving axle 110. Ultimately, the first end 151 of the second latch 150 will be against the first end 223 of the concave portion 222 of the second cam 220.

Figure 9C:
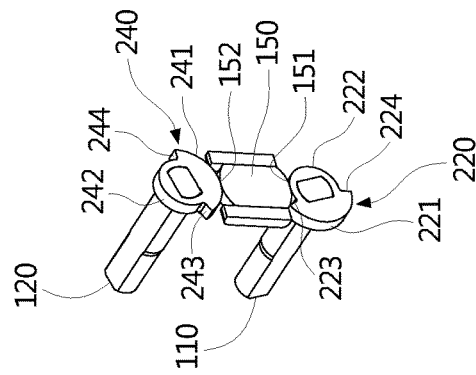
FIG. 9B and FIG. 9C respectively illustrate cross sectional views of the hinge of FIG. 9A at section A-A and section B-B.
Figure 9B:
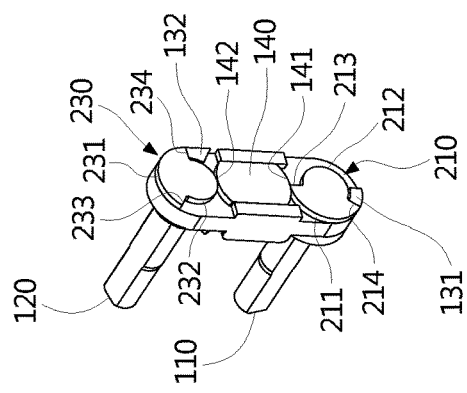
Figure 9A:
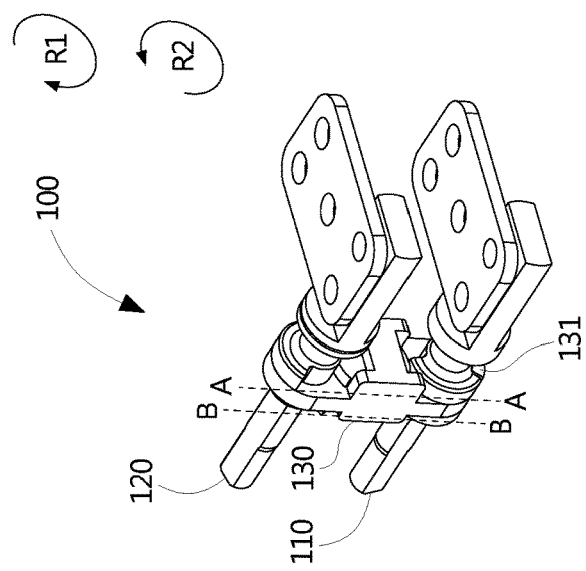
FIG. 9A illustrates a schematic view of the hinge of FIG. 2 at 360 degrees.

Please refer to FIG. 5 and FIG. 9A to FIG. 9C. FIG. 9A is a schematic view of the hinge 100 of FIG. 2 at 360 degrees without showing a part of components. FIG. 9B is a cross sectional view of the hinge 100 of FIG. 9A at section A-A regarding the first latch 140, the first cam 210, and the third cam 230. FIG. 9C is a cross sectional view of the hinge 100 of FIG. 9A at section B-B regarding the second latch 150, the second cam 220, and the fourth cam 240. While the hinge 100 is at 360 degrees, i.e., the second revolving axle 120 revolves in the first clock direction R1 to 90 degrees (or the connecting bracket 130 and the first revolving axle 110 together revolve in the second clock direction R2 about the second revolving axle 120 to 90 degrees), the second restriction block 132 abuts against the second end 234 of the concave portion 232 of the third cam 230 to make the second revolving axle 120 be incapable of continuously revolving in the first clock direction R1 after the second revolving axle 120 have revolved to 90 degrees. The second end 152 of the second latch 150 abuts against the convex portion 241 of the fourth cam 240 and the first end 151 of the second latch 150 abuts against the first end 223 of the concave portion 222 of the second cam 220 to make the first revolving axle 110 be incapable of revolving in the first clock direction R1. While the hinge 100 is at 270 degrees, the first revolving axle 110 can revolve in the first clock direction R1 and switch to a configuration with a less angle (i.e., while the hinge 100 is at 270 degrees, the hinge 100 can revolve back to 90 degrees or a lesser angle). However, while the hinge 100 is at 360 degrees, the first revolving axle 110 cannot revolve in the first clock direction R1 and also cannot revolve in the second clock direction R2. Therefore, while the hinge 100 is at 360 degrees and needs to be switched to a configuration with a less angle, only the first revolving axle 110 and the connecting bracket 130 as a whole can revolve in the first clock direction R1. That is, the configuration of FIG. 9C returns to the configuration of FIG. 8C. In general, while the hinge is unfolded from 0 degrees to 360 degrees, the first latch and the second latch are pushed in sequence to slide from one side to another side to abut against the second revolving axle 120 and the first revolving axle 110 respectively so that the first revolving axle 110 and the second revolving axle 120 can be unlocked or locked, and thus this design can achieve a hinge with a three-stage switching structure and be used in an electronic device.

Concisely, according to the embodiments of the present invention, two axles of the hinge is capable of revolving in sequence, such that two plates of the electronic device can be relatively folded and unfolded, smoothly, and the experience of use can be improved.

While the present invention has been described by way of example and in terms of the preferred embodiments, it is to be understood that the present invention needs not be limited to the disclosed embodiments. For anyone skilled in the art, various modifications and improvements within the spirit of the present invention are covered under the scope of the present invention. The covered scope of the present invention is based on the appended claims.

What is claimed is:

1. A hinge comprising:
    a connecting bracket provided with a first restriction block and a second restriction block;
    a first revolving axle pivotally disposed on the connecting bracket, the first revolving axle being provided with a first cam and a second cam, the first cam cooperating with the first restriction block in restricting a revolving stroke of the first revolving axle;
    a second revolving axle parallel with the first revolving axle and pivotally disposed on the connecting bracket, the second revolving axle being provided with a third cam and a fourth cam, the third cam cooperating with the second restriction block in restricting a revolving stroke of the second revolving axle, wherein peripheries of the first to the fourth cams are respectively provided with a convex portion and a concave portion, the concave portion has a first end and a second end;
    a first latch slidably disposed between the first cam and the third cam, the first latch having a first end and a second end respectively corresponding to the first cam and the third cam; and
    a second latch slidably disposed between the second cam and the fourth cam, the second latch having a first end and a second end respectively corresponding to the second cam and the fourth cam;
    wherein while the hinge is unfolded from 0 degrees to 360 degrees, the first latch and the second latch are pushed in sequence to slide from one side to another side to abut against the second revolving axle and the first revolving axle respectively.

2. The hinge of claim 1, wherein while the hinge is at 0 degrees, the first restriction block abuts against the first end of the concave portion of the first cam to make the first revolving axle be incapable of revolving in a first clock direction; the second end of the first latch abuts against the convex portion of the third cam and the first end of the first latch abuts against the second end of the concave portion of the first cam to make the first revolving axle be incapable of revolving in a second clock direction opposite to the first clock direction; the second restriction block abuts against the first end of the concave portion of the third cam to make the second revolving axle be incapable of revolving in the second clock direction.

3. The hinge of claim 2, wherein while the hinge is at a first angle, the first end of the second latch abuts against the convex portion of the second cam and the second end of the second latch abuts against the first end of the concave portion of the fourth cam to make the second revolving axle be incapable of revolving in the first clock direction; the first end and the second end of the first latch respectively correspond to the concave portion of the first cam and the concave portion of the third cam to make the first revolving axle be capable of revolving in the second clock direction.

4. The hinge of claim 3, wherein while the hinge is at a second angle, the first restriction block abuts against the second end of the concave portion of the first cam to make the first revolving axle be incapable of revolving in the second clock direction; the first end of the first latch abuts against the convex portion of the first cam and the second end of the first latch abuts against the first end of the concave portion of the third cam to make the second revolving axle be incapable of revolving in the second clock direction; the first end and the second end of the second latch respectively correspond to the concave portion of the second cam and the concave portion of the fourth cam to make the second revolving axle be capable of revolving in the first clock direction.

5. The hinge of claim 4, wherein while the hinge is at 360 degrees, the second restriction block abuts against the second end of the concave portion of the third cam to make the second revolving axle be incapable of revolving in the first clock direction; the second end of the second latch abuts against the convex portion of the fourth cam and the first end of the second latch abuts against the first end of the concave portion of the second cam to make the first revolving axle be incapable of revolving in the first clock direction.

6. The hinge of claim 4, wherein the first angle is 90 degrees, and the second angle is 270 degrees.

7. The hinge of claim 1, further comprising a first torque member and a second torque member, wherein the first torque member is disposed on the first revolving axle, and the second torque member is disposed on the second revolving axle.

8. An electronic device comprising:
the hinge of claim 1;
a first plate connected to the first revolving axle; and
a second plate connected to the second revolving axle.

9. The electronic device of claim 8, wherein the hinge further comprises a first fixation member and a second fixation member, the first fixation member is connected to the first revolving axle, the second fixation member is connected to the second revolving axle; the first plate is connected to the first revolving axle by being connected to the first fixation member, and the second plate is connected to the second revolving axle by being connected to the second fixation member.

* * * * *